Patented Aug. 13, 1929.

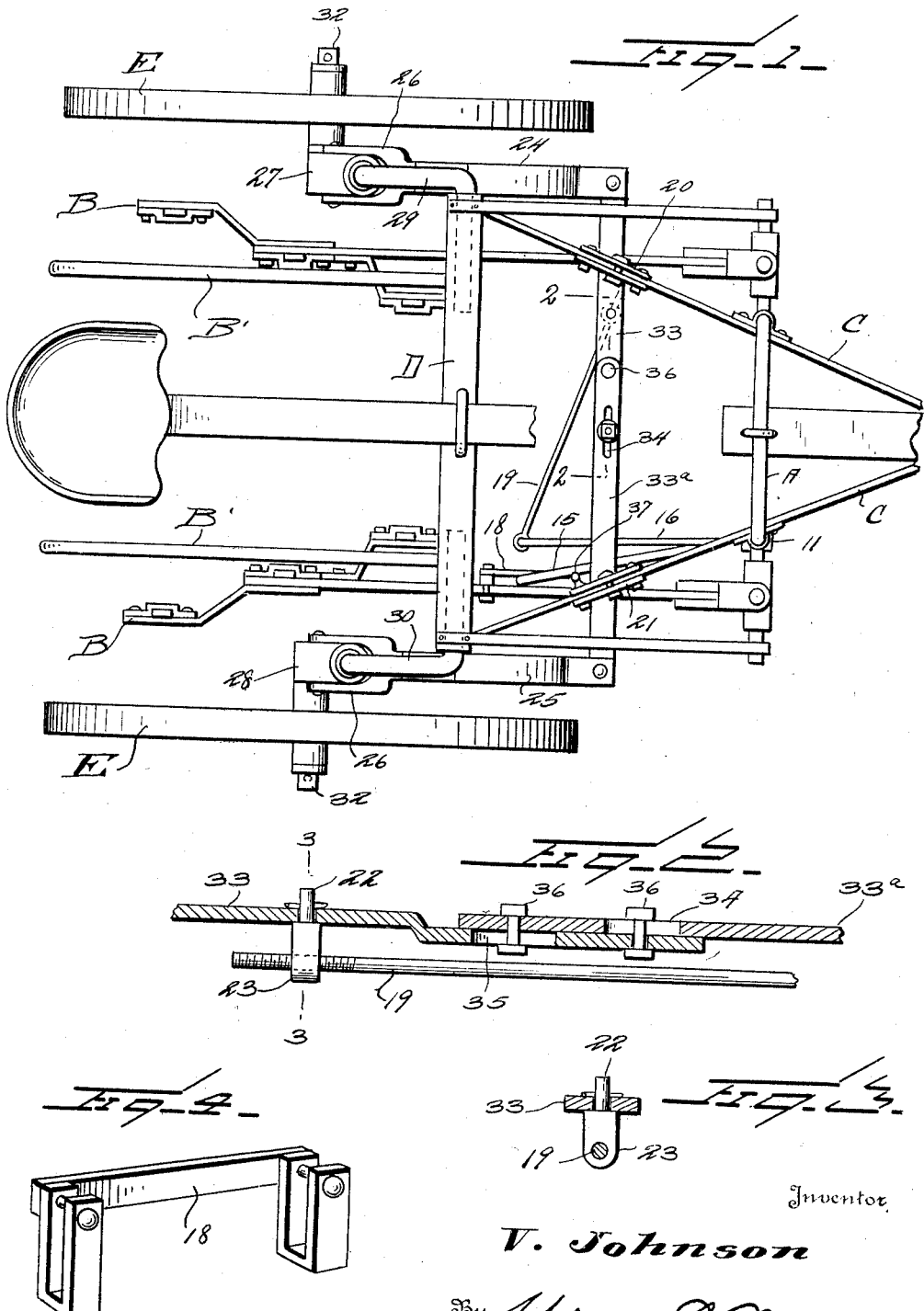

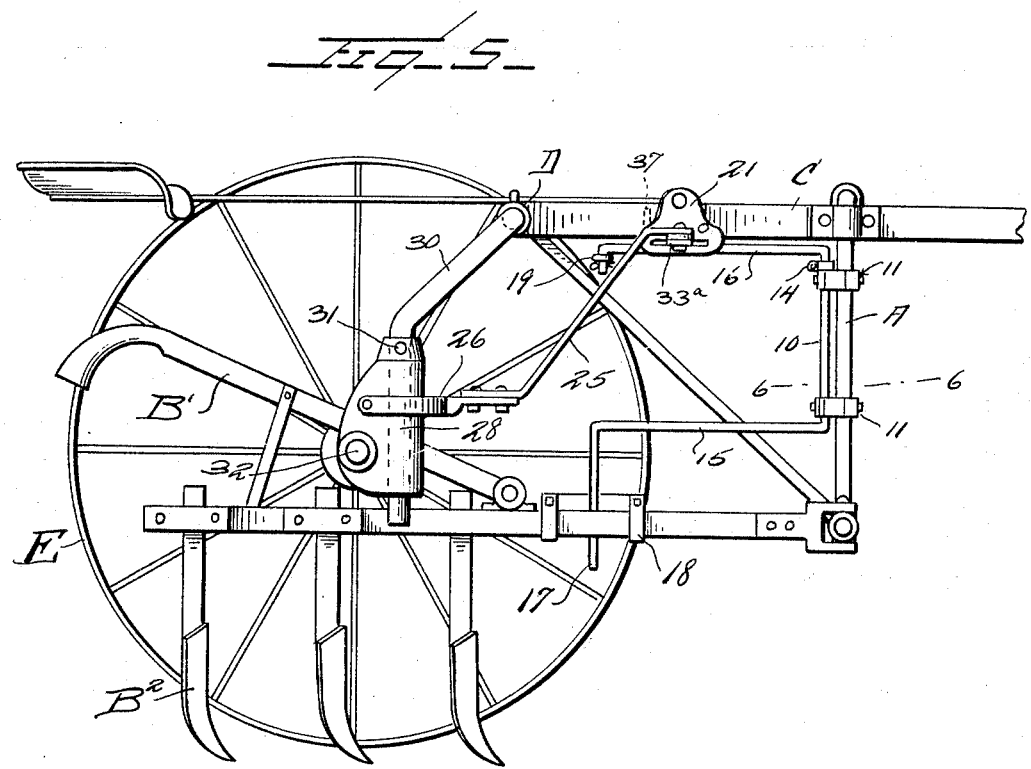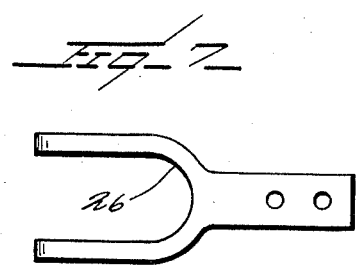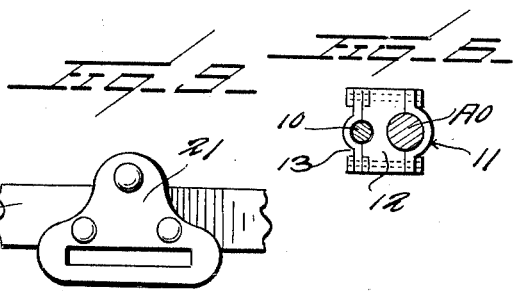

1,724,203

UNITED STATES PATENT OFFICE.

VICTOR JOHNSON, OF POMEROY, IOWA.

CONTROLLING ATTACHMENT FOR CULTIVATORS.

Application filed March 29, 1928. Serial No. 265,680.

This invention relates to an attachment for cultivators, particularly adapted to be used on single row cultivators and designed for the purpose of controlling the wheels when cultivating, the general object of the invention being to provide a controlling attachment for the wheels which will thereby keep the shovels where they should be in the row so that in case one horse gets a little ahead of the other or the team does not pull evenly, this attachment may be used to keep the wheel of the cultivator from coming in contact with the beam and keep the shovels, therefore, in the row, preventing the shovels from plowing up the corn or other crop.

My invention is illustrated in the accompanying drawings, wherein:—

Figure 1 is a top plan view of a controlling attachment constructed in accordance with my invention applied to a cultivator;

Figure 2 is a section on the line 2—2 of Figure 1;

Figure 3 is a section on the line 3—3 of Figure 2;

Figure 4 is a fragmentary perspective view of the arm guide;

Figure 5 is a side elevation of a cultivator with my attachment applied, the near wheel being removed;

Figure 6 is a section on the line 6—6 of Figure 5;

Figure 7 is a top plan view of the fork;

Figure 8 is a top plan view of the mounting sleeve;

Figure 9 is a front elevation of the bracket.

In these drawings, I have illustrated a riding cultivator of ordinary make. My attachment, as shown in Figure 5, includes the vertically disposed shaft 10 which is mounted upon one vertical side portion of the cultivator arch A, and mounted on this vertical portion of the cultivator arch by means of the clamps 11 which may be of any suitable construction, these clamps being double clamps comprising the middle member 12 and the lateral members 13, these being formed to provide jaws, one jaw gripping the vertical member of the cultivator arch and the other affording a bearing for the shaft 10 (see Figure 6).

These parts 12 and 13 are held together by bolts or in any other suitable manner. There are two of these clamps shown as mounted upon the arch A for the purpose of supporting the shaft 10. The shaft 10 also carries upon it the clip 14 which rests upon the upper bearing. The shaft 10 is provided with a lower arm 15 and an upper arm 16. The lower arm 15 has an angularly disposed or vertically extending portion 17, and this portion 17 extends downward through a clamp 18 attached to one of the cultivator beams B. This beam is swingingly engaged with the arch in the usual manner and is provided with a handle B' whereby this beam may be swung. The beam carries the plows B² in any suitable or usual manner.

The clamp 18, it will be seen, has portions engaging around the cultivator beam B and a longitudinally extending member, between which and the beam the angular end 17 of the arm 15 passes loosely. Thus the cultivator beam may be raised or lowered without in any way affecting the shaft 10 but if the cultivator beam be swung toward the right or left it will oscillate the shaft 10.

The upper arm 16 of the attachment is formed at its end with an angular terminal engaging in an eye formed in one end of a transversely extending rod 19 (see Figure 1). Slidingly mounted in clamps 20 and 21 which engage the converging frame bars C of the cultivator is a transverse bar formed in two sections 33 and 33ª, as will be later explained. One of these sections carries upon it the depending pin 22 having an eye 23 with which the connecting rod 19 has screw-threaded engagement so that this connecting rod may be adjusted through the eye 23 to any desired position. The transverse bar, whose detailed structure will be later stated, is connected at its ends to spindle clamps 24 and 25. These spindle clamps extend downward and rearward and are bifurcated, as at 26, at their ends to embrace sleeves 27 and 28 mounted upon angularly bent rods 29 and 30.

The rod 29 is bent into an L, one leg of the L supporting the member 27 and the other leg of the L being inserted in a tubular member D which forms part of the frame member of the cultivator. The member 29 is angularly bent into an L form to provide end portions disposed in angular relation to each other and an intermediate angular portion, one of these end portions being inserted within the tubular member D.

The other end portion is inserted in the sleeve 28 and the sleeves 27 and 28 are held upon their supporting members 29 and 30 by means of set screws 31 or in any other suitable manner. Each of the sleeves 27 and 28 carries a spindle 32 for the support of the cultivator wheels E.

It will be seen that by the means illustrated the wheels may be turned laterally in the same direction at the same time, or in other words that when the beam B which engages with the shaft 10 is shifted toward the right in Figure 1, both wheels will be turned in the same direction, and when it is shifted toward the left in Figure 1, both of the wheels will be turned in the same direction.

The transverse bar which connects the wheel-shifting members 24 and 25 together is formed in two sections 33 and 33ª, the section 33ª being slotted at one end, as at 34, and the section 3 being also slotted, as at 35. Bolts 36 pass through these sections so that the section 33ª may be shifted longitudinally with relation to the other section of the bar to thus increase or decrease the length of this transverse bar. The members 24 and 25 are loosely bolted to the extremities of the transverse bar formed of the sections 33 and 32ª so as to give a little play in the parts. The clamp 21, it will be noted is provided with a pin or knob 37 with which the eye on the rod 19 is adapted to engage. This rod 19 can, therefore, be unhooked from the arm 16 and connected to the knob or pin 37 and in this case the wheels will not be affected by the attachment but the wheels will always remain equi-distant from each other.

In the use of this attachment, it controls the wheels E and thereby keeps the shovels where they should be in the row. Thus the wheel of the cultivator can be kept from coming in contact with the beam, and the handle B' on the right hand side of the cultivator and which controls the right hand cultivator beam controls the shifting of the wheels E in the manner stated. If the beam is moved to one side or the other, the wheels must also move with it unless the connecting rod 19 is detached from the arm 16 and connected to the pin 37 on the guide clamp 21.

On some cultivators, when the beams are raised the wheels move back a trifle, and when the beams are lowered the wheels move forward a trifle. Under these circumstances, the raising or lowering of the beams would cause the sleeves 27 and 28 to swing a little forward or a little backward, as the case may be. This is permitted by the pivot for the yoke 26 and by the fact that the members 25 are of relatively thin metal which will bend to permit of this and also by the fact that the member 21 is slotted, permitting the bar composed of the sections 33 and 33ª to shift within the slot. It is to be understood that the guide 18 might be changed in form and modified to suit other forms of cultivator.

While I have illustrated a particular form of my invention which in practice has proved to be particularly effective, I do not wish to be limited to the exact embodiment illustrated as this might be modified in many ways without departing from the spirit of the invention.

I claim:—

1. The combination with a cultivator having a supporting frame including forwardly extending bars and a transversely extending tubular element open at its ends and an arch, beams swingingly connected to the arch for vertical and horizontal movement, of means for controlling said wheels from one of the beams of the cultivator comprising a vertical shaft mounted upon the arch and having a lower arm and an upper arm, the lower arm having sliding engagement in a vertical plane with one of the cultivator beams and longitudinal movement relative thereto but being connected for swinging movement therewith, a transverse bar mounted upon the forwardly extending bars of the frame for transverse sliding movement, wheel-supporting members mounted within said tubular element of the frame and carrying sleeves provided with laterally projecting spindles, wheels mounted upon said spindles, arms extending rearward from the transverse bar and operatively connected to said sleeves whereby the wheels may be turned, and a connecting rod between the upper arm of said shaft and said transverse bar.

2. The combination with a cultivator having a supporting frame including forwardly extending bars, a transversely extending tubular element open at its ends and an arch, and beams swingingly connected to the arch for vertical and horizontal movement, of means for controlling said wheels from one of the beams of the cultivator comprising a vertical shaft mounted upon the arch and having a lower arm and an upper arm, the lower arm having sliding engagement in a vertical plane with one of the cultivator beams and longitudinal movement relative thereto but being connected for swinging movement therewith, a transverse bar mounted upon the forwardly extending bars of the frame for transverse sliding movement, wheel-supporting members mounted within said tubular element of the frame and carrying rotatable sleeves provided with laterally projecting spindles, wheels mounted upon said spindles, arms extending rearward from the transverse bar and operatively connected to said sleeves whereby the wheels may be shifted, and a connecting rod between the upper arm of said shaft and said transverse bar, the transverse bar being formed in two sections for longitudinal adjustment upon each other.

3. The combination with a cultivator having a supporting frame including forwardly extending bars, a transversely extending tubular element open at its ends, an arch, and beams swingingly connected to the arch for vertical and horizontal movement, of means for controlling said wheels from one of the beams of the cultivator comprising a vertical shaft mounted upon the arch and having a lower arm and an upper arm, the lower arm having sliding engagement in a vertical plane with one of the cultivator beams and longitudinal movement relative thereto but being connected for swinging movement therewith, a transverse bar mounted upon the forwardly extending bars of the frame for transverse sliding movement, wheel-supporting members mounted within said tubular element of the frame and carrying sleeves provided with laterally projecting spindles, wheels mounted upon said spindles, arms extending rearward from the transverse bar and operatively connected to said sleeves whereby the wheels may be shifted, a connecting rod between the upper arm of said shaft and said transverse bar, and clamps upon the converging frame bars of the cultivator through which the transverse bar slidingly passes.

4. An attachment for cultivators comprising a vertical shaft having an upper and a lower horizontal arm, the lower arm having a downward extension, a clamp attachable to one of the beams of a cultivator and formed to provide a longitudinal slot within which the downward extension of the lower arm may operate, means for supporting the vertical shaft upon the arch of the cultivator, clamps adapted to be applied to the frame of the cultivator, a transverse bar slidable through said clamps, a connecting rod between the upper arm of the shaft and said bar, rearwardly extending arms carried by the ends of the shaft and forked at their rear extremities, wheel-supporting members angular in form and adapted to be inserted in the ends of the usual tubular member forming part of the frame of a cultivator, and sleeves mounted upon said supporting members with which the forks of said arms engage, the sleeves having wheel spindles.

5. An attachment for cultivators comprising a vertical shaft having an upper and a lower horizontal arm, the lower arm having a downward extension, a clamp attachable to one of the beams of a cultivator and formed to provide a longitudinal slot within which the downward extension of the lower arm may operate, means for supporting the vertical shaft upon the arch of the cultivator, clamps adapted to be applied to the frame of the cultivator, a transverse bar slidable through said clamps, a connecting rod between the upper arm of the shaft and said bar, rearwardly extending arms carried by the ends of the shaft and forked at their rear extremities, wheel-supporting members angular in form and adapted to be inserted in the ends of the usual tubular member forming part of the frame of a cultivator, and sleeves mounted upon said supporting members with which the forks of said arms engage, the sleeves having wheel spindles, the transverse bar being formed in two parts adjustably engaged with each other.

In testimony whereof I hereunto affix my signature.

VICTOR JOHNSON.